(12) United States Patent
Mendis et al.

(10) Patent No.: US 9,275,374 B1
(45) Date of Patent: Mar. 1, 2016

(54) METHOD AND APPARATUS FOR PRE-FETCHING PLACE PAGE DATA BASED UPON ANALYSIS OF USER ACTIVITIES

(75) Inventors: Charles Mendis, Mountain View, CA (US); Thomas G. Nourse, Half Moon Bay, CA (US)

(73) Assignee: GOOGLE INC., Mountain View, CA (US)

( * ) Notice: Subject to any disclaimer, the term of this patent is extended or adjusted under 35 U.S.C. 154(b) by 353 days.

(21) Appl. No.: 13/296,668

(22) Filed: Nov. 15, 2011

(51) Int. Cl.
| | |
|---|---|
| G06F 15/16 | (2006.01) |
| G06Q 10/10 | (2012.01) |
| G06T 9/00 | (2006.01) |
| G06T 9/20 | (2006.01) |
| H04L 12/58 | (2006.01) |

(52) U.S. Cl.
CPC ............... *G06Q 10/107* (2013.01); *G06T 9/00* (2013.01); *G06T 9/20* (2013.01); *H04L 12/58* (2013.01); *H04L 12/585* (2013.01)

(58) Field of Classification Search
CPC .... G01C 21/26; G06Q 10/107; H04L 12/585; H04L 12/58; G06T 9/00; G06T 9/20
USPC .......................................................... 709/206
See application file for complete search history.

(56) References Cited

U.S. PATENT DOCUMENTS

| | | | |
|---|---|---|---|
| 4,984,279 | A | 1/1991 | Kidney et al. |
| 5,345,086 | A | 9/1994 | Bertram |
| 5,793,310 | A | 8/1998 | Watanabe et al. |
| 5,848,373 | A | 12/1998 | DeLorme et al. |
| 5,905,508 | A | 5/1999 | Beitel |
| 6,061,688 | A | 5/2000 | Kilpatrick et al. |
| 6,073,076 | A | 6/2000 | Crowley et al. |
| 6,094,685 | A | 7/2000 | Greenberg et al. |

(Continued)

FOREIGN PATENT DOCUMENTS

| | | |
|---|---|---|
| KR | 10-2008-071228 | 8/2008 |
| WO | WO-98/28714 A1 | 7/1998 |
| WO | WO-2009/027161 A1 | 3/2009 |

OTHER PUBLICATIONS

Reichenbacher et al., "The World in Your Pocket—Towards a Mobile Cartography," Proc. of the 20th International Cartographic Conference, 2001, 9 pages.

(Continued)

*Primary Examiner* — Jude Jean Gilles
*Assistant Examiner* — Jaren M Means
(74) *Attorney, Agent, or Firm* — Marshall, Gerstein & Borun LLP

(57) ABSTRACT

A computer-implemented method and system for pre-fetching label and place page data from a remote, backend mapping system, and subsequently displaying the pre-fetched data, is disclosed. User activity data generated by execution of an application on the mobile device may be analyzed to determine geographic locations that indicate places the user is likely to be in the future. The user activity data may be analyzed at either the frontend or the backend to determine these geographic locations. Label and place page data corresponding to the geographic locations may then be retrieved from the mapping system and stored in a cache memory of the mobile computing device. The label and place page data may describe map features and include plain text, a data feed, or a URL. During periods of reduced connectivity to the mapping system, the mobile device may retrieve the stored label and place page data from the cache memory.

23 Claims, 4 Drawing Sheets

(56) References Cited

U.S. PATENT DOCUMENTS

| | | | |
|---|---|---|---|
| 6,191,782 B1 | 2/2001 | Mori et al. |
| 6,199,150 B1 | 3/2001 | Yoshikawa |
| 6,330,453 B1 | 12/2001 | Suzuki et al. |
| 6,400,690 B1 | 6/2002 | Liu et al. |
| 6,421,354 B1 | 7/2002 | Godlewski |
| 6,442,757 B1 | 8/2002 | Hancock et al. |
| 6,453,233 B1 | 9/2002 | Kato |
| 6,546,334 B1 | 4/2003 | Fukuchi et al. |
| 6,571,279 B1 | 5/2003 | Herz et al. |
| 6,615,131 B1 | 9/2003 | Rennard et al. |
| 6,671,424 B1 | 12/2003 | Skoll et al. |
| 6,691,128 B2 | 2/2004 | Natesan et al. |
| 6,853,911 B1 | 2/2005 | Sakarya |
| 6,889,134 B2 | 5/2005 | Nakane et al. |
| 7,006,820 B1 | 2/2006 | Parker et al. |
| 7,050,905 B2 | 5/2006 | Nemeth |
| 7,136,748 B2 | 11/2006 | Umezu et al. |
| 7,263,368 B2 | 8/2007 | Knauerhase et al. |
| 7,315,259 B2 | 1/2008 | Sacks |
| 7,327,349 B2 | 2/2008 | Robbins et al. |
| 7,461,528 B2 | 12/2008 | Taniguchi et al. |
| 7,464,109 B2 | 12/2008 | Modi |
| 7,472,172 B2 | 12/2008 | Anderson et al. |
| 7,502,780 B2 | 3/2009 | Thorpe |
| 7,502,876 B1 | 3/2009 | Nemirovsky et al. |
| 7,529,639 B2 | 5/2009 | Rasanen et al. |
| 7,551,182 B2 | 6/2009 | Bethune et al. |
| 7,571,422 B2 | 8/2009 | Adel et al. |
| 7,577,520 B2 | 8/2009 | Nomura |
| 7,584,434 B2 | 9/2009 | Okamura |
| 7,610,147 B2 | 10/2009 | Umezu et al. |
| 7,663,671 B2 | 2/2010 | Gallagher et al. |
| 7,710,421 B2 | 5/2010 | Muramatsu |
| 7,711,473 B2 | 5/2010 | Sekine et al. |
| 7,734,412 B2 | 6/2010 | Shi et al. |
| 7,739,037 B2 | 6/2010 | Sumizawa et al. |
| 7,796,837 B2 | 9/2010 | Lueck |
| 7,831,383 B2 | 11/2010 | Oohashi |
| 7,831,387 B2 | 11/2010 | Golding et al. |
| 7,839,421 B2 | 11/2010 | Bethune et al. |
| RE41,983 E | 12/2010 | Wallner |
| 7,873,465 B2 | 1/2011 | Geelen et al. |
| 7,920,968 B2 | 4/2011 | Chapin et al. |
| 7,925,624 B2 | 4/2011 | Vosshall et al. |
| 7,925,982 B2 | 4/2011 | Parker et al. |
| 7,962,565 B2 | 6/2011 | Coker |
| 7,974,959 B2 | 7/2011 | Sawai et al. |
| 7,975,025 B1 | 7/2011 | Szabo et al. |
| 7,983,659 B2 | 7/2011 | Shinya |
| 7,996,445 B2 | 8/2011 | Fair et al. |
| 8,005,612 B2 | 8/2011 | Asahara et al. |
| 8,010,407 B1 | 8/2011 | Santoro et al. |
| 8,014,796 B2 | 9/2011 | Boudreau et al. |
| 8,014,945 B2 | 9/2011 | Cooper et al. |
| 8,032,297 B2 | 10/2011 | Jakobson |
| 8,060,389 B2 | 11/2011 | Johnson |
| 8,060,406 B2 | 11/2011 | Blegen |
| 8,060,582 B2 | 11/2011 | Bliss et al. |
| 8,078,641 B2 | 12/2011 | Mao et al. |
| 8,095,307 B2 | 1/2012 | Ebert et al. |
| 8,126,885 B2 | 2/2012 | Prasad et al. |
| 8,180,851 B1 | 5/2012 | CaveLie |
| 8,204,966 B1 | 6/2012 | Mendis et al. |
| 8,229,914 B2 | 7/2012 | Ramer et al. |
| 8,280,414 B1 | 10/2012 | Nourse et al. |
| 8,301,371 B2 | 10/2012 | Sheha et al. |
| 8,340,898 B2 | 12/2012 | Currie et al. |
| 8,361,543 B2 | 1/2013 | Nielsen et al. |
| 8,363,065 B2 | 1/2013 | Scott et al. |
| 8,385,591 B1 | 2/2013 | Anguelov et al. |
| 8,489,332 B2 | 7/2013 | Tomobe et al. |
| 8,489,669 B2 | 7/2013 | Johnson |
| 8,538,685 B2 | 9/2013 | Johnson |
| 8,543,130 B2 | 9/2013 | Golds |
| 8,549,105 B1 | 10/2013 | Nourse et al. |
| 8,683,008 B1 | 3/2014 | CaveLie |
| 8,711,181 B1 | 4/2014 | Nourse et al. |
| 8,803,920 B2 | 8/2014 | Kalai et al. |
| 8,805,959 B1 | 8/2014 | Mendis et al. |
| 8,812,031 B2 | 8/2014 | CaveLie et al. |
| 2002/0067353 A1 | 6/2002 | Kenyon et al. |
| 2002/0133491 A1 | 9/2002 | Sim et al. |
| 2003/0187984 A1 | 10/2003 | Banavar et al. |
| 2004/0044752 A1 | 3/2004 | Hamaguchi et al. |
| 2004/0117108 A1 | 6/2004 | Nemeth |
| 2004/0203998 A1 | 10/2004 | Knauerhase et al. |
| 2004/0204849 A1 | 10/2004 | Shipley et al. |
| 2004/0205199 A1 | 10/2004 | Gormish |
| 2004/0220730 A1 | 11/2004 | Chen et al. |
| 2005/0287509 A1 | 12/2005 | Mohler |
| 2006/0026170 A1 | 2/2006 | Kreitler et al. |
| 2006/0067224 A1 | 3/2006 | Ohara |
| 2006/0069749 A1 | 3/2006 | Herz et al. |
| 2006/0080032 A1 | 4/2006 | Cooper et al. |
| 2006/0129636 A1 | 6/2006 | Matsuura et al. |
| 2006/0184541 A1 | 8/2006 | Kim |
| 2006/0190812 A1 | 8/2006 | Ellenby et al. |
| 2006/0195256 A1 | 8/2006 | Nakamura et al. |
| 2006/0277271 A1* | 12/2006 | Morse ............... H04L 67/26 709/217 |
| 2007/0011171 A1 | 1/2007 | Nurminen et al. |
| 2007/0050128 A1 | 3/2007 | Lee et al. |
| 2007/0080830 A1 | 4/2007 | Sacks |
| 2007/0143014 A1 | 6/2007 | Sekine et al. |
| 2007/0218891 A1* | 9/2007 | Cox ............... G01C 21/20 455/422.1 |
| 2007/0229490 A1 | 10/2007 | Boudreau et al. |
| 2007/0242077 A1 | 10/2007 | Danan |
| 2007/0273558 A1 | 11/2007 | Smith et al. |
| 2007/0282621 A1 | 12/2007 | Altman et al. |
| 2007/0282915 A1 | 12/2007 | Vosshall et al. |
| 2008/0065329 A1 | 3/2008 | Wilcox et al. |
| 2008/0071988 A1 | 3/2008 | Schloter et al. |
| 2008/0082225 A1 | 4/2008 | Barrett |
| 2008/0086264 A1* | 4/2008 | Fisher ............... G01C 21/30 701/533 |
| 2008/0095472 A1 | 4/2008 | Smith |
| 2008/0102857 A1 | 5/2008 | Kim |
| 2008/0132249 A1 | 6/2008 | Hamilton |
| 2008/0154655 A1 | 6/2008 | Hartmann et al. |
| 2008/0177469 A1 | 7/2008 | Geelen et al. |
| 2008/0192053 A1 | 8/2008 | Howell et al. |
| 2008/0195311 A1 | 8/2008 | Karaoguz et al. |
| 2008/0214210 A1 | 9/2008 | Rasanen et al. |
| 2008/0215240 A1 | 9/2008 | Howard et al. |
| 2008/0238723 A1 | 10/2008 | Fein et al. |
| 2008/0270579 A1 | 10/2008 | Herz et al. |
| 2008/0291205 A1 | 11/2008 | Rasmussen et al. |
| 2009/0030778 A1 | 1/2009 | Zapata et al. |
| 2009/0054103 A1 | 2/2009 | Stavenow et al. |
| 2009/0063042 A1* | 3/2009 | Santesson ............ G09B 29/106 701/533 |
| 2009/0125228 A1 | 5/2009 | Dicke et al. |
| 2009/0128483 A1 | 5/2009 | Robbins et al. |
| 2009/0132163 A1 | 5/2009 | Ashley, Jr. et al. |
| 2009/0153563 A1 | 6/2009 | Tudose |
| 2009/0182500 A1 | 7/2009 | Dicke |
| 2009/0198767 A1 | 8/2009 | Jakobson et al. |
| 2009/0210388 A1 | 8/2009 | Elson et al. |
| 2009/0228211 A1 | 9/2009 | Rasanen et al. |
| 2009/0244095 A1 | 10/2009 | Bowman et al. |
| 2009/0281718 A1 | 11/2009 | Gibran et al. |
| 2009/0287750 A1 | 11/2009 | Banavar et al. |
| 2009/0319177 A1 | 12/2009 | Khosravy et al. |
| 2009/0319181 A1 | 12/2009 | Khosravy et al. |
| 2009/0319188 A1 | 12/2009 | Otto |
| 2009/0326810 A1 | 12/2009 | Callaghan et al. |
| 2010/0017129 A1 | 1/2010 | Wilcox et al. |
| 2010/0020091 A1 | 1/2010 | Rasmussen et al. |
| 2010/0106397 A1 | 4/2010 | Van Essen |
| 2010/0106801 A1 | 4/2010 | Bliss et al. |
| 2010/0117810 A1 | 5/2010 | Hagiwara et al. |
| 2010/0131186 A1 | 5/2010 | Geelen et al. |
| 2010/0153007 A1 | 6/2010 | Crowley |

(56) References Cited

U.S. PATENT DOCUMENTS

| | | |
|---|---|---|
| 2010/0174721 A1 | 7/2010 | Mou |
| 2010/0179940 A1 | 7/2010 | Gilder et al. |
| 2010/0182500 A1 | 7/2010 | Ishii et al. |
| 2010/0250646 A1 | 9/2010 | Dunagan et al. |
| 2010/0274899 A1 | 10/2010 | Shrivastava et al. |
| 2010/0321399 A1 | 12/2010 | Ellren et al. |
| 2010/0332120 A1 | 12/2010 | Tomobe et al. |
| 2010/0333085 A1 | 12/2010 | Criddle et al. |
| 2011/0054776 A1 | 3/2011 | Petrov et al. |
| 2011/0093515 A1 | 4/2011 | Albanese |
| 2011/0095993 A1 | 4/2011 | Zuverink |
| 2011/0098917 A1 | 4/2011 | LeBeau et al. |
| 2011/0098918 A1 | 4/2011 | Siliski et al. |
| 2011/0130949 A1 | 6/2011 | Arrasvuori |
| 2011/0161875 A1 | 6/2011 | Kankainen |
| 2011/0213798 A1 | 9/2011 | Osuka et al. |
| 2011/0276263 A1 | 11/2011 | Shimotani et al. |
| 2011/0300848 A1 | 12/2011 | Boudreau et al. |
| 2011/0306304 A1 | 12/2011 | Forutanpour et al. |
| 2011/0307648 A1 | 12/2011 | Nomura |
| 2011/0316854 A1 | 12/2011 | Vandrovec |
| 2012/0005290 A1 | 1/2012 | Cooper et al. |
| 2012/0022786 A1 | 1/2012 | Siliski et al. |
| 2012/0022787 A1 | 1/2012 | LeBeau et al. |
| 2012/0038662 A1 | 2/2012 | Dicklin et al. |
| 2012/0083995 A1 | 4/2012 | Vorona |
| 2012/0146809 A1 | 6/2012 | Oh et al. |
| 2012/0221239 A1 | 8/2012 | Cooper et al. |
| 2012/0253488 A1 | 10/2012 | Shaw et al. |
| 2012/0254804 A1 | 10/2012 | Sheha et al. |
| 2013/0097197 A1 | 4/2013 | Rincover et al. |
| 2013/0147846 A1 | 6/2013 | Kalai et al. |
| 2013/0325307 A1 | 12/2013 | Agarwal et al. |
| 2014/0073358 A1 | 3/2014 | Sridhar et al. |

OTHER PUBLICATIONS

Piras et al., "Compact GML: merging mobile computing and mobile cartography," CRS4, Center for Advanced Studies, Research and Development in Sardinia, 2004, 20 pages.

Molina, "Aiming and Guiding Navigation with a Non-visual GPS Application," Department of Design Sciences Faculty of Engineering, Lund University, Sep. 9, 2010, 64 pages.

Kirchner et al. "A Location-aware Prefetching Mechanism," Project work at Distributed Information Systems Laboratory LSIR, 2004.

Weber, "Mobile Map Browsers: Anticipated User Interaction for Data Pre-Fetching," Thesis, The University of Maine, Dec. 2010.

Office action for U.S. Appl. No. 13/244,764 dated Nov. 28, 2011.

Office action for U.S. Appl. No. 13/244,717 dated Nov. 15, 2011.

Google Developers, "Google Maps API," (2012). Retrieved from the Internet on Aug. 31, 2012: URL:https://developers.google.com/maps.

International Search Report and Written Opinion for Application No. PCT/US2012/051574, dated Feb. 15, 2013.

International Search Report and Written Opinion for Application No. PCT/US2012/051577, dated Feb. 15, 2013.

International Search Report and Written Opinion for Application No. PCT/US2012/065002, dated Mar. 29, 2013.

International Search Report and Written Opinion for Application No. PCT/US2012/065008, dated Mar. 29, 2013.

International Search Report for Application No. PCT/US2012/051564, dated Feb. 18, 2013.

Mapquest, "JavaScript Maps API," (2012). Retrieved from the Internet on Aug. 31, 2012: URL:http://developer.mapquest.com/web/products/featured/javascript.

MSDN, "Get Started Using Bing Maps," (2012). Retrieved from the Internet on Aug. 31, 2012: URL:http://msdn.microsoft.com/en-us/library/dd877180.aspx.

Wiki, "API," (2012). Retrieved from the Internet on Aug. 31, 2012: URL:http://wiki.openstreetmap.org/wiki/API.

Descampe et al., "Data Prefetching for Smooth Navigation of Large Scale JPEG 2000 Images," IEEE, Multimedia and Expo, pp. 1-4 (2005).

International Preliminary Report on Patentability for Application No. PCT/US2012/051564, dated Apr. 1, 2014.

Weber et al., "Mobile Map Browers: Anticipated User Interaction for Data Pre-Fetching," University of Maine, 101 pages (2010).

International Preliminary Report on Patentability for Application No. PCT/US2012/051574, dated Jun. 17, 2014.

International Preliminary Report on Patentability for Application No. PCT/US2012/051577, dated Jun. 17, 2014.

International Preliminary Report on Patentability for Application No. PCT/US2012/065002, dated May 20, 2014.

International Preliminary Report on Patentability for Application No. PCT/US2012/065008, dated Jun. 10, 2014.

Extended European Search Report for Application No. 12855169.4, dated Mar. 23, 2015.

Magdalene et al., "Cache Prefetch and Replacement with Dual Valid Scopes for Location Dependent Data in Mobile Environments," Proceedings of the 11th International Conference on Information Integration and Web-Based Applications & Services, pp. 364-371 (2009).

Ren et al., "Using Semantic Caching to Manage Location Dependent Data in Mobile Computing," Proceedings of the Annual International Conference on Mobile Computing and Networking, pp. 210-221 (2000).

\* cited by examiner

METHOD AND APPARATUS FOR PRE-FETCHING PLACE PAGE DATA BASED UPON ANALYSIS OF USER ACTIVITIES

FIELD OF TECHNOLOGY

The present disclosure relates generally to pre-fetching label and place page data for subsequent display on a mobile computing device, wherein the label and place page data is pre-fetched based upon an analysis of data generated by an application executing on a client computing device and the generated data includes an indication of a geographic location.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many mobile computing devices such as cellular phones, tablet computers, notebooks, etc., incorporate global positioning system (GPS) applications and related hardware. When actuated on the device, the GPS applications may communicate with a GPS transmitter or other GPS hardware on the device and a backend application server to provide a digital map of an area around the device's current position to a user, as well as label data and place page data that describes features illustrated within the map.

However there may be circumstances when the mobile computing device is in an area with limited network, cellular, or other communication access with the backend application server. Intermittent communication with backend components of the mapping system may limit or otherwise precludes, immediate, real time access to such data, potentially adversely affecting the user's experience.

SUMMARY

Features and advantages described in this summary and the following detailed description are not all-inclusive. Additional features and advantages may be apparent to one of ordinary skill in the art in view of the drawings, specification, and claims hereof. Additionally, other embodiments may omit one or more (or all) of the features and advantages described in this summary.

In accordance with this disclosure, a computer-implemented method may pre-fetch label and place page data from a remote mapping system for subsequent display on a client computing device. The method may comprise analyzing user activity data to determine geographic location data, wherein the user activity data includes data generated by execution of an application at the client computing device and the user activity data includes the geographic location data. The method may further comprise receiving the geographic location data at the remote mapping system, wherein the remote mapping system includes vector data specifying geometric shapes for map features to be rendered on the client computing device and further includes label and place page data describing each map feature, the label and place page data including one or more of plain text, a data feed, and a URL, and both the vector data and the label and place page data correspond to the geographic location data. Still further, the method may comprise matching the geographic location data to label and place page data, sending the matched label and place page data to the client computing device, storing the matched label and place page data in a cache memory of the client computing device, and subsequently retrieving the matched label and place page data from the cache memory of the client computing device without further communication between the remote mapping system and the client computing device.

The application may include one or more of a mapping application, a web browser, a trip planning application, an e-mail application, and a social networking application. User activity data may include one or more of a history file corresponding to a log of mapping application searches, web page requests, locations, flight information, e-mail discussions, and social networking profile information. Geographic location data may include one or more of a city name, an address, an airport code, or global positioning system coordinates.

The method may further comprise determining if the matched geographic location data is relevant, wherein relevant geographic location data includes a number of geographic location indications above a threshold. Receiving the geographic location data may include receiving relevant geographic location data at the remote mapping system. Matching the geographic location data to the label and place page data may include matching the relevant geographic location data to the label and place page data.

In further embodiments, a computer-implemented method for pre-fetching label and place page data from a remote mapping system for subsequent display on a client computing device during conditions of no connectivity between the remote mapping system and the client computing device may be described. The method may comprise periodically analyzing user activity data at the client computing device to determine geographic location data corresponding to the user activity data, wherein the user activity data includes data generated by execution of an application at the client computing device. The user activity data may indicate the geographic location data and the application may include one or more of a mapping application, a web browser, a trip planning application, an e-mail application, and a social networking application. The user activity data may include one or more of a history file corresponding to a log of mapping application searches, web page requests, locations, flight information, e-mail discussions, and social networking profile information, and the determined geographic location data may include one or more of a city name, an address, an airport code, or global positioning system coordinates. The method may further comprise sending the determined geographic location data to the remote mapping system and receiving label and place page data corresponding to the determined geographic location data at the client computing device. The label and place page data may describe graphic map features and include one or more of plain text, a data feed, and a URL. Still further, the method may comprise storing the corresponding label and place page data in a cache memory of the client computing device, and subsequently retrieving the corresponding label and place page data from the cache memory of the client computing device without further communication between the remote mapping system and the client computing device.

The method described herein may also match the determined geographic location data to the corresponding label and place page data stored within a data repository of the remote mapping system. Furthermore, the method may determine if the corresponding geographic location data is relevant, wherein relevant geographic location data includes a number of geographic location indications above a threshold.

The method may also send relevant geographic location data from the client computing device to the remote mapping system and the remote mapping system may match the relevant geographic location data to the corresponding label and place page data.

In still further embodiments, a client computing device may comprise a processor and a memory storing an application and instructions for execution by the processor. The instructions may include using the processor to periodically cause user activity data to be sent to a remote mapping system via a network connection, wherein the user activity data indicates a geographic location and includes data generated by execution of the application using the processor. The client computing device may also include a transceiver for receiving label and place page data from the remote mapping system via the network connection, a cache memory to store the label and place page data received by the transceiver, and a mapping module including instructions to cause the processor to display the received label and place page data from the cache memory without further communication between the remote mapping system and the client computing device.

In still further embodiments, a client computing device may comprise a processor and a memory storing an application and instructions for execution by the processor, the instructions for using the processor to analyze user activity data to determine geographic location data, wherein the user activity data includes data generated by execution of an application at the client computing device and the user activity data includes geographic location data. The device may also include a transceiver for sending a request for label and place page data to a remote mapping system and to receive label and place page data in response to the request. The request may include the determined geographic location data and the remote mapping system may include vector data specifying geometric shapes for map features to be rendered on the client computing device. Label and place page data at the remote mapping system may describe each map feature and include one or more of plain text, a data feed, and a URL. Both the vector data and the label and place page data may correspond to the geographic location data. A cache memory may store the requested label and place page data received by the transceiver and a mapping module may include instructions to cause the processor to display the received label and place page data from the cache memory without further communication between the remote mapping system and the client computing device.

In still further embodiment, a tangible computer readable medium may store instructions that are adapted for execution on a processor of a mobile computing device. The instructions, when executed, may cause the processor to analyze user activity data to determine geographic location data, wherein the user activity data includes data generated by execution of an application at the mobile computing device and the user activity data includes geographic location data. The instructions may also cause the processor to receive the geographic location data at the remote mapping system, wherein the remote mapping system includes vector data specifying geometric shapes for map features to be rendered on the mobile computing device and further includes label and place page data describing each map feature, the label and place page data including one or more of plain text, a data feed, and a URL, and both the vector data and the label and place page data correspond to the geographic location data. Furthermore, the instructions may cause the processor to match the geographic location data to label and place page data, send the matched label and place page data to the mobile computing device, store the matched label and place page data in a cache memory of the mobile computing device, and subsequently retrieve the matched label and place page data from the cache memory of the mobile computing device without further communication between the remote mapping system and the mobile computing device.

In still further embodiments, a tangible computer readable medium may store instructions adapted for execution on a processor of a mobile computing device. The instructions, when executed, may cause the processor to periodically analyze user activity data at the mobile computing device to determine geographic location data corresponding to the user activity data. The instructions, when executed, may further cause the processor to send the determined geographic location data to the remote mapping system, receive label and place page data corresponding to the determined geographic location data at the mobile computing device (the label and place page data describing graphic map features and including one or more of plain text, a data feed, and a URL), store the corresponding label and place page data in a cache memory of the mobile computing device, and subsequently retrieve the corresponding label and place page data from the cache memory of the mobile computing device without further communication between the remote mapping system and the client computing device.

Figure 1A:
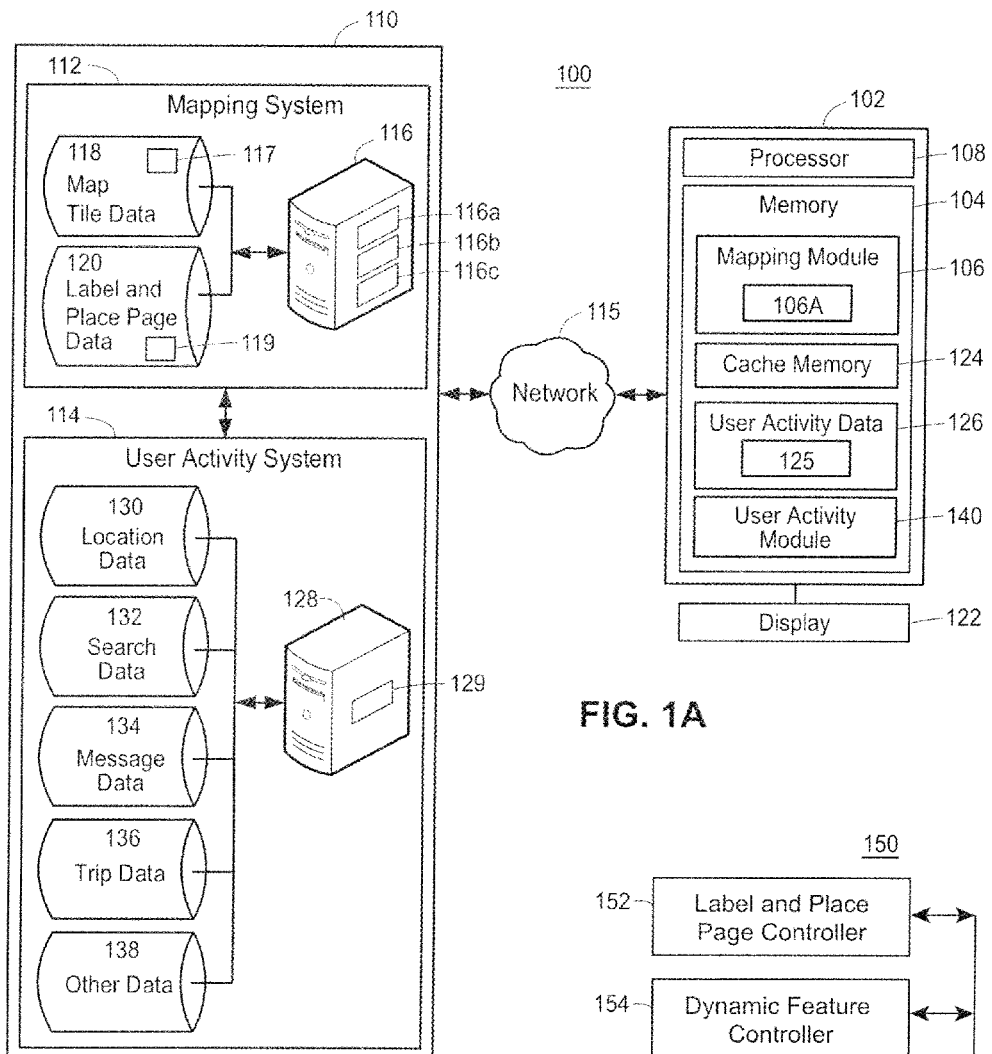
FIG. 1A is a high-level block diagram of a system for pre-fetching data for a web-based mapping system.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Embodiments of systems and methods for efficiently transferring place page data that is logically linked to map data from a place page data server to a client device are discussed below. To render a map image in a web browser or another application, the client device may request map data from the map server via a communication network, and the map server in response may provide vector data that describes map content as well as label and place page data that describes features of the rendered vector data. More particularly, vector data may specify various geometric shapes (e.g., using mathematical descriptions) for map features and indicate how these shapes should be positioned for rendering various map features such as roads, buildings, parks, bodies of water, etc. on the client computing device. Label and place page data may describe each map feature using text, graphics, web pages, etc. The map server also may specify which visual styles the client device should apply to various vector-based descriptions of map elements.

Graphical data to render a map image on a mobile computing device is relatively data (and thus memory) intensive. Label and place page data may be separately pre-fetched or pre-downloaded via a network connection before it is requested by the user so that this place page data is available independent of all, or some of, the memory burden of accompanying map tile data. For example, data associated with the digital map may include label data for the various buildings, roads, and other graphic elements of the map. Other data may include place page data that provides detailed information about various buildings, businesses, points of interest, or other graphic elements of the map. Label and place page data may be requested separately from or in conjunction with the graphic elements of a map from a label and place page data server via a network connection between a mobile computing device and the server. This label and place page data may then be selected from the server and stored in a cache memory of the mobile computing device. The label and place page data may then be available at times of low connectivity between the mobile device and the server when graphic elements corresponding to the cached label and place page data are displayed at the mobile device.

As described below, user activity at the mobile computing device may be analyzed to determine locations from where the user spends most of his/her time, searches the user has performed via mapping applications and web browsers, trips the user has planned, e-mail content, etc. For example, the place page data may be requested from the server for cache storage based on logs and other files that track user actions with applications executing on the mobile computing device. The data may be pre-fetched to the mobile device, either at the request of the mobile device or pushed to the mobile device by a backend server.

The user activity analysis may identify one or more predetermined geographical locations for which the user is possibly or likely to desire information in the future, such as to view map data, as well as to view information regarding locations proximate the user's location, such as label data and/or place page data. Once the data is pre-downloaded and stored in the memory of the mobile device, the mobile device may quickly present the data without having to obtain data in real time from a backend label and place page server. Pre-fetching the data may reduce display rendering latency and lead to a better user experience. The analysis may be performed at the backend or at the mobile device and may consider all, or portions of, data related to the user's online activity.

FIG. 1A is a high-level block diagram that illustrates a system 100 for pre-fetching mapping system data including graphical data and label and place page data for a mapping module stored in memory and executed by a processor of a client computing device 102. Generally, the client computing device 102 may include a memory 104 storing a mapping module 106 that is executed by a processor 108. The mapping module 106 may include instructions to pre-fetch label and place page data from a backend server based on an analysis of user activity with the client computing device 102. The client computing device 102 may include a personal computer, smart phone, tablet computer, or other computing device including a GPS transceiver and capable of executing the various modules, instructions, etc., described herein. The mapping module 106 may communicate with backend components 110 including a mapping system 112 and a user activity system 114 via a network connection such as the Internet 115 or other type of networks (e.g., LAN, a MAN, a WAN, a mobile, a wired or wireless network, a private network, or a virtual private network, etc.). While the system 100 is illustrated in FIG. 1A as including the user activity system 114 as a backend component, the components and functions of the user activity system 114 described herein may also be incorporated on the client computing device 102. For example, the user activity system 114 may be implemented as computer-executable instructions of the mapping module 106.

A mapping system server 116, which may be in the form of one or more servers, may send and receive map tile data 117 from a map tile data repository 118, and label and place page data 119 from a label and place page data repository 120 that corresponds to geographical features of the map tile data 117. In some embodiments, the mapping system 112 and the system server 116 may send computer-executable instructions and data to allow the mapping module 106 to render a digital map in a display component 122 of the client device 102. Generally speaking, user activity data 125 may be analyzed to determine geographical locations at which the user is likely to request data from the mapping server 116 in the future. The user activity data 125 may be collected from a variety of other applications and modules executing on the client device 102 or in communication with the device 102 (e.g., a web browser, a user activity tracking module, a trip planning module, an email module, etc.) and stored in a user activity data repository 126. The data 125 may include a web browsing history, e-mail text, a calendar appointment for travel, etc. The data 125 may be analyzed at the client device 102 or sent to a backend user activity system 114 for analysis to determine likely future geographic locations for the user from the generated data. Label and place page data 119 may then be pre-fetched for those locations and stored in a cache memory 124 of the client device memory 104 for possible display to a user during a period of low connectivity to the mapping system 112 or at any other time.

The mapping system 112 may generate each map tile with label and place page data 119 according to a vector graphics format. The client device 102 (e.g., a mobile phone, tablet computer, etc.) may locally generate a raster image for each tile from the vector data corresponding to each map tile. In an embodiment, the system 100 retrieves the requested data from various servers. For example, the mapping system server 116 may include a processor 116a and a computer-readable memory 116b that stores a map controller 116c in the form of computer instructions, for example, that may be executable on the processor 116a directly (e.g., as compiled code) or indirectly (e.g., as a script interpreted by another application executing on the processor 116a). The computer-readable memory 116b may include volatile memory to store computer instructions and data on which the computer instructions operate at runtime (e.g., Random Access Memory or RAM) and, in an embodiment, persistent memory such as a hard disk, for example. In an embodiment, the map controller 116c includes a dynamic feature controller that generates vector data for various map elements that are provided as map content to the client device 102. As used herein, a map feature (or simply feature) may correspond to an individual map element such as a building or an aggregation of several map elements such as several buildings, a park, and several pedestrian paths of a college campus. In general, a map feature may be described using vector data. Label and place page data 119 may include data that describes these map tile features including textual information, images, web content that describes map tile features (i.e., businesses, landmarks, etc.), etc.

In some embodiments, the mapping module 106 receives vector data that specifies graphical characteristics of map features as well as label and place page data 119 that describes these features. Vector data specifies the map features as geometric shapes using mathematical descriptions of points and paths connecting the points. For example, rather than specifying each pixel that makes up a raster image of a line segment, vector data may specify the two endpoints of the line segment and indicate that the two endpoints are connected by a straight line. The mapping module 106 then may apply label and place page data 119 as appropriate to the specified line segment, so that the line segment is displayed with a particular title, description, etc. As another example, the vector data may specify the contour of a building, and the corresponding label and place page data 119 may specify the name, description, web page, contact information, address, etc., of the building. In other words, rather than receiving raster images from the map server 116, the mapping module 106 may receive instructions for drawing a map image on an output device 122 of the client computing device 102 and execute the instructions to generate a raster map image. In some cases, however, vector data also may include raster images as certain component elements that cannot be easily represented in a vector format.

For simplicity, the client device 102 is illustrated with a single processor 108. However, the client device 102 in other embodiments may include additional processing units (not shown) such as a graphics processing unit (GPU) configured to facilitate image rendering on the output device 122, for example. Further, the mapping module 106 may utilize a library of graphics functions for efficiently generating a map image as well as label and place page data 119. For example, the memory 104 may store a plugin, such as an OpenGL® or Direct3D® library, having functions for rendering graphics which various applications executing on the client 102, including the mapping module 106, may access via an application programming interface (API). In another embodiment, the memory 104 stores a plugin particularly suitable for browser applications, such as WebGL®, for example. Also, in some embodiments, the memory 104 stores additional software components that facilitate efficient rendering of images and label and place page data 119 via the output device 122. For example, the memory 104 may store an Adobe® Flash® plugin or an O3D plugin.

Figure 1B:
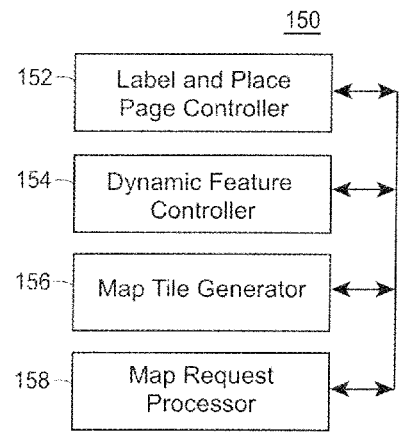
FIG. 1B is a high-level block diagram of a component of the system for pre-fetching label and place page data for a web-based mapping system.

Now referring to FIG. 1B, a map controller 150 may include various functions and operate as a module in the memory of the client computing device 102 or in the server 116 of FIG. 1A, for example, or the various functions may be split among the client computing device 102 and the server 116, as described above. According to an embodiment, the map controller 150 is implemented as a set of instructions that are stored on a computer-readable medium and executable on one or more processors. For example, referring back to FIG. 1A, the map controller 150 and its various functions may be distributed among the memories 116b, 104 and processors 116a, 108.

According to an embodiment, the map controller 150 includes a label and place page controller 152, a dynamic feature controller 154, a map tile generator 156, and a map request processor 158. The map request processor 158 may be configured to process requests from client devices, such as the client device 102, for map data 117 and label and place page data 119 corresponding to specified geographic regions. Each request may correspond to a single electronic message or a series of electronic messages, depending on the scenario and/or embodiment. For example, the map request processor 158 may receive a request for map data corresponding to a two-mile-wide region centered at latitude 41° 52' 43" and longitude −87° 38' 11". The request may also indicate a zoom level for which map data is being requested. Still further, the request may indicate that map data is being requested for rendering a transit map. The request in this case may include a map type indication field set to the appropriate value. Further, the map request processor 158 may receive a request for label and place page data 119 corresponding to the requested map data. Depending on the scenario, the map request processor 158 may receive a request for map data and a request for label and place page data 119 in a single electronic message, e.g., a single HTTP message, or separately in respective electronic messages.

After the map request processor 158 receives a request for map data and/or label and place page data 119 from a client device, the map controller 150 provides appropriate data to the client device via one or more electronic messages. In an embodiment, the map tile generator 156 generates map data as a set of map tile descriptors, such that each map tile descriptor describes a map tile, i.e., a portion of a map image of a certain size (e.g., 256 by 256 pixels). The size of a geographic region represented by an individual map tile depends on the zoom level with which the map tile is associated, so that a single map tile at a lower zoom level illustrates a larger geographic area than a single map tile at a higher zoom level. The map tile generator 156 may generate each map tile descriptor according to a vector graphics format, and a client device, such as the client device 102 of FIG. 1A, may locally generate a raster image for each tile. In an embodiment, the map tile generator 156 retrieves the requested data from a map database such as the map database 118 illustrated in FIG. 1A, for example.

When providing map data to a client device, the map controller 150 may separate map content 117 from label and place page data 119. In some cases, the map controller 150 may provide vector data that describes map content without providing the corresponding label and place page data 119 to the client device at the same time (if, for example, the client device already has the necessary label and place page data) or, conversely, may provide label and place page data 119 without providing the vector data for graphical map content to which the label and place page data 119 applies (for rendering a geographic region at a more detailed zoom level and using label and place page data 119 that was sent with a previous request for the geographic region at a different zoom level, for example). Further, in some scenarios, the map controller 150 provides vector data and label and place page data 119 at the same time (e.g., in a same electronic message or a series of electronic messages).

The dynamic feature controller 154 may be communicatively coupled to the map tile generator 156 and configured to determine which map elements are associated with the requested map data and generate vector-based descriptions of these map elements. For example, the dynamic feature controller 154 may determine that, in response to a request for map data corresponding to zoom level Zi for a certain geographic region, vector descriptors corresponding to interstate highways, large bodies of water, etc. must be generated, whereas in response to another request for map data corresponding to zoom level Zj for the same geographic region, additional vector data corresponding to local roads and buildings must be generated. Further, in some cases, the dynamic feature controller 154 generates different sets of vector data for different map types. For example, a terrain map may include map elements that are not included in a basic map for the same geographic region and zoom level.

The label and place page controller 152 may be communicatively coupled to the other components of the map controller 150 as well as a user activity system 114 (FIG. 1A). When the map request processor 158 receives a request for map data and queries the map data repository 118 for map tile data 117, the label and place page controller 152 queries the label and place page data repository 120 for label and place page data 119 that corresponds to the geographical area of the requested map tile data 117. As with the map tile data 117, the amount of label and place page data corresponding to the requested map data 117 may depend on the zoom level with which the map tile is associated. For example, a single map tile at a lower zoom level illustrates a larger geographic area and, thus, corresponds to more label and place pace data 119 than a single map tile at a higher zoom level. In some embodiments, the label and place page controller 152 may query the label and place page data repository 120 for only the data 119 that is visible at the zoom level of the requested map data 117. In other embodiments, the label and place page controller 152 may query the repository 120 for more data 119 that corresponds to other zoom levels than would be visible at the zoom level of the requested map data 117. The label and place page controller 152 may then insert the retrieved label and place page data 119 in the vector containing the requested map tile data 119 or may send the data 117 separately from the map tile data 117. The client device, such as the client device 102 of FIG. 1A, may locally generate a raster image for each tile including the data 117 or may provide a link to the data 119 in the image.

In some embodiments, the user activity system 114 (FIG. 1A) may include a user activity system server 128 that includes a module 129 to receive and analyze user activity data 125 for pre-fetching label and place page data 120 for later display at the client device 102. For example, the user activity data repository 126 may receive and store data from a variety of other modules and applications executing on the client device 102 or in communication with the device 102 (e.g., a web browser, a user activity tracking module, a trip planning module, an email module, etc.). The client device 102 may then forward the data 125 to the user activity system 114 for analysis. Furthermore, the client device 102 may periodically forward a web browser history, e-mail text including geographic locations, travel documents, or other data generated or received by applications executing on the client device 102 to the user activity system 128. Where the user activity data 125 is received by the user activity system 114, the module 129 may analyze the data 125 to determine any geographic locations at which the user will likely request data in the future. The user activity system module 129 may then forward that geographic location data to the mapping system and the label and place page controller 152 to retrieve label and place page data 119 corresponding to the geographic locations determined from the user activity data 125. When the received data 125 is analyzed at the backend by the module 129 to determine likely future geographic locations for the user, the label and place page controller 152 may execute instructions to push the label and place page data 125 from the label and place page data repository 120 to the cache memory 124 of the client device 102. When the data 125 is analyzed at the front end, a module on the client device (e.g., the mapping module, etc.) may implement the functions of the label and place page controller 152 and pull the label and place page data 125 from the label and place page data repository 120 to the cache memory 124 of the client device 102.

In some embodiments, the user activity server 128 may store the user activity data 125 in one or more data repositories. For example, the user activity data 125 may include the user's location 130, browser search history data 132, e-mail and other message data 134, trip planning data 136, or other data 138 indicating geographical locations the user is planning to visit or is likely to visit. The module 129 may include computer-executable instructions to analyze the data stored in the data repositories 130, 132, 134, 136, and 138, as described herein. Analysis of the user activity data 125 by the module 129 may determine location data that the user activity system server 128 may send to the mapping system 112 and the label and place page controller 152.

Figure 2:
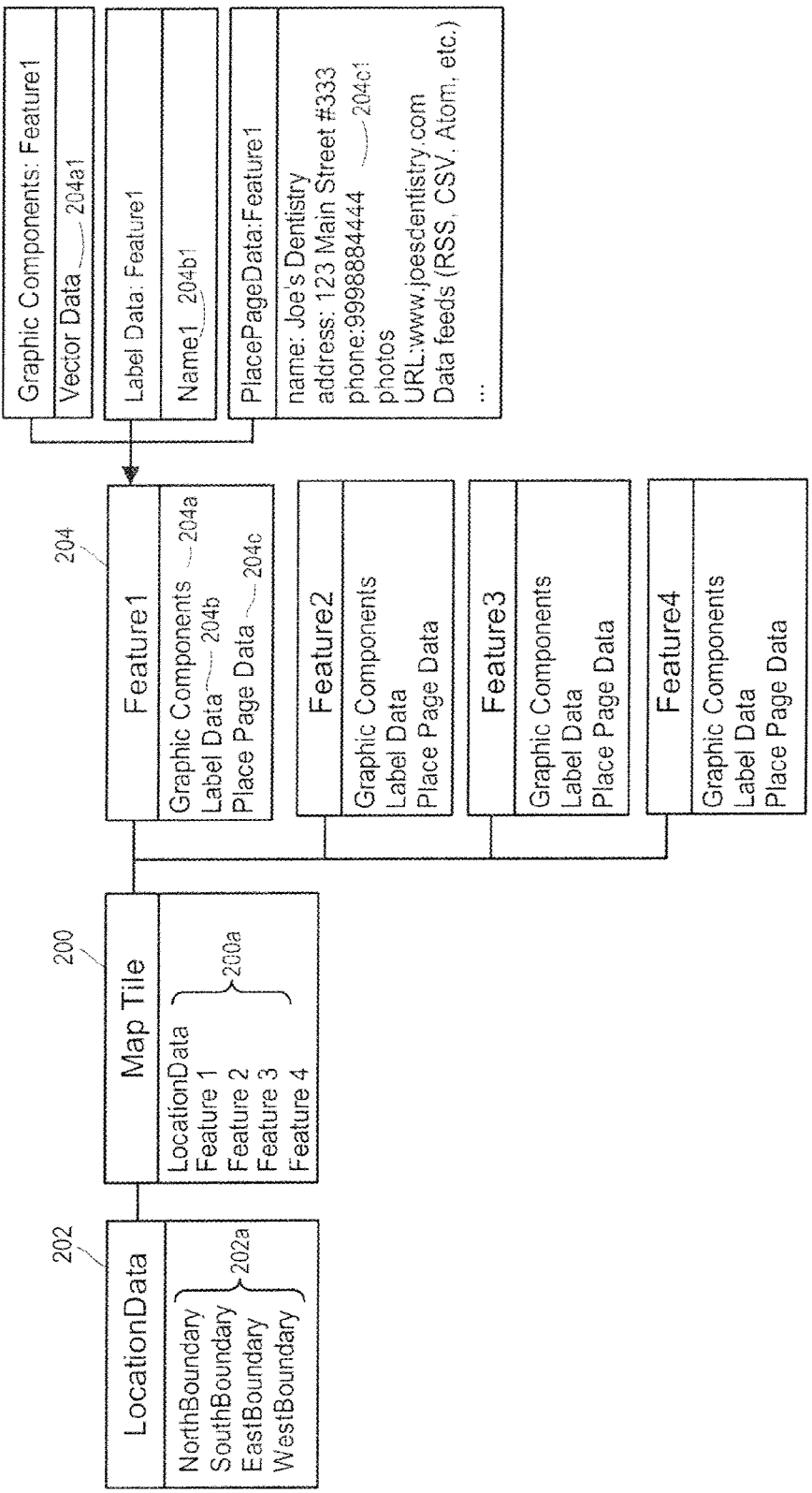
FIG. 2 is an exemplary data structure for label and place page data that is pre-fetched according to user activity data.

FIG. 2 illustrates one embodiment of a high-level block diagram for label and place page data corresponding to map tile data. A map tile 200 may include a plurality of attributes 200a, for example, location data 202, and several features 204, as described above. The data components that make up a raster image of a map on a client computing device may be logically linked among various data sources. For example, map tile data 117 stored within the map tile data repository 118 may be logically linked to label and place page data 119 of the label and place page data repository 120. The location data 202 may include particular coordinates 202a that describe the specific geographic location of the map tile 200 that represents a geographic area. In some embodiments, the location data 202 includes a plurality of boundaries 202a such as a north, south, east, and west boundary for the map tile 200. The location data 202 may include latitude and longitude coordinates as determined by a global positioning system (GPS) or other system that is able to determine where the geographic location or physical object is located. Each feature 204 of a map tile 200 may include graphic components 204a and logical links to label and place page data 204b. Graphic components 204a for each feature 204 may include vector data 204a1 retrieved from the map tile data repository 118 to illustrate a feature 204 within the map tile as rendered by the mapping module 106. Label data 204b for each feature 204 may include text data such as a name, title, or other designation 204b1 corresponding to a feature 204 as retrieved from the label and place page data repository 120 or other source. Place page data 204c for each feature 204 may include text, images, web and data feeds, as well as other information corresponding to a feature (i.e., a place of business, a landmark, etc.) as retrieved from the label and place page data repository 120, a data feeds, or other source. Each feature 204 may also include location data 202. The location data for a feature 204 may include a GPS coordinate, a position within the boundaries 202a of the map tile 200, etc.

The label and place page data 204b, 204c may include various groups of information that describe characteristics of the features 204 within a map tile 200. In some embodiments, the information 204b, 204c includes listing information for businesses, points of interest, shopping centers, parks, etc., that are graphically represented within the map tile 200. The information 204b, 204c may also include specifications and other information describing the history of the object, physical specifications, etc. For example, the information 204b, 204c may include several features that include an icon, location, and data 204b, 204c for businesses, points of interest, etc., within the map tile 200. Label and place page data 204b, 204c may include text, photos, and other data to render a web page including information from various web resources that describes a particular listing represented by a feature 204, such as an icon or other graphic item, within the map tile 200.

Figure 3:
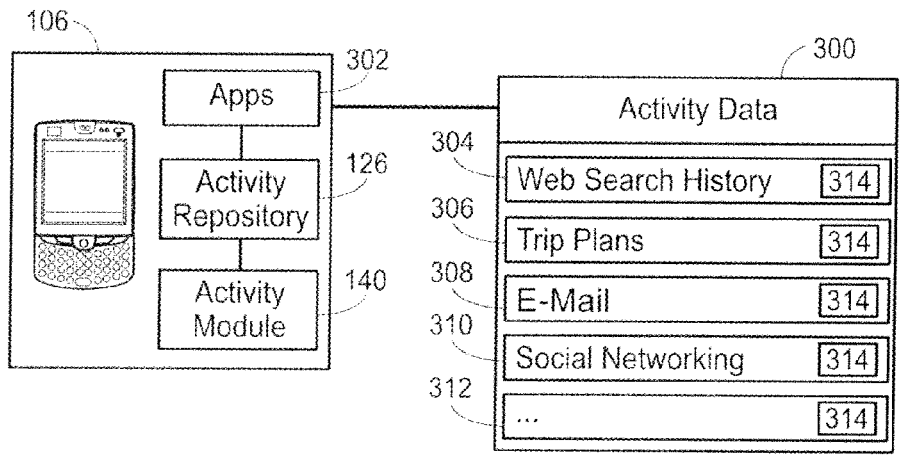
FIG. 3 is an exemplary block diagram of a mobile computing device and a data structure for user activity data.

FIG. 3 is a representation of user activity data 300 that may be used by the system 100 to determine the data to be pulled or pushed from the label and place page data repository 120 for storage in cache memory 124 and subsequently displayed on the client device 106. In some embodiments, the activity data 300 may be collected by a user activity module 140 and sent to a user activity data repository 126 on the client computing device 102. The module 140 may then push the data 125 to the backend user activity system 114, or the user activity system 114 may pull the data 125 to one or more backend repositories (e.g., data repositories 130, 132, 134, 136, 138) for analysis by the user activity system module 129. The module 140 and repository 126 may be in communication with one or more activity data-producing applications 302 executing on the client device 102. In other embodiments, the applications 302 may periodically send the data 300 to a backend component such as the user activity system 114 without sending the data 300 to a module 140 or repository 126. For example, the backend user activity system module 129 executing on the user activity system server 128 may include computer-executable instructions to cause the client device 102 to pull or retrieve user activity data 125 from the repository 126 or directly from the applications 302 and forward the data to the system 114. In other embodiments, the applications 302 periodically send data 300 to the user activity system 114 for analysis by the module 129 without first sending the data 300 to a client-side repository 126 or executing instructions of the client-side user activity module 140.

The data 300 may include any type of history, log, or other data produced by an application 302 executing on the client device 102. In some embodiments, the data 300 includes web search history data 304 from a web browser application, trip plan data 306 from a trip planning application, location-related e-mail data 308 from an e-mail application, social networking data 310 indicating a geographic location (e.g., a hometown location, a favorite places data entry, etc.), or other data 312, etc. Of course, one or more of the backend user activity system module 129 and the front end user activity module 140 may monitor any application 302 executing on the client device 102 for data that indicates a geographic location and that could be used to pre-fetch label and place page data 119 from the repository 120 for cache storage and subsequent display on the client device 102 executing the application 302. Each of the various sets of user activity data 304, 306, 308, 310, 312, may include data 314 that indicates a geographic location (i.e., user activity location data 314).

Figure 4:
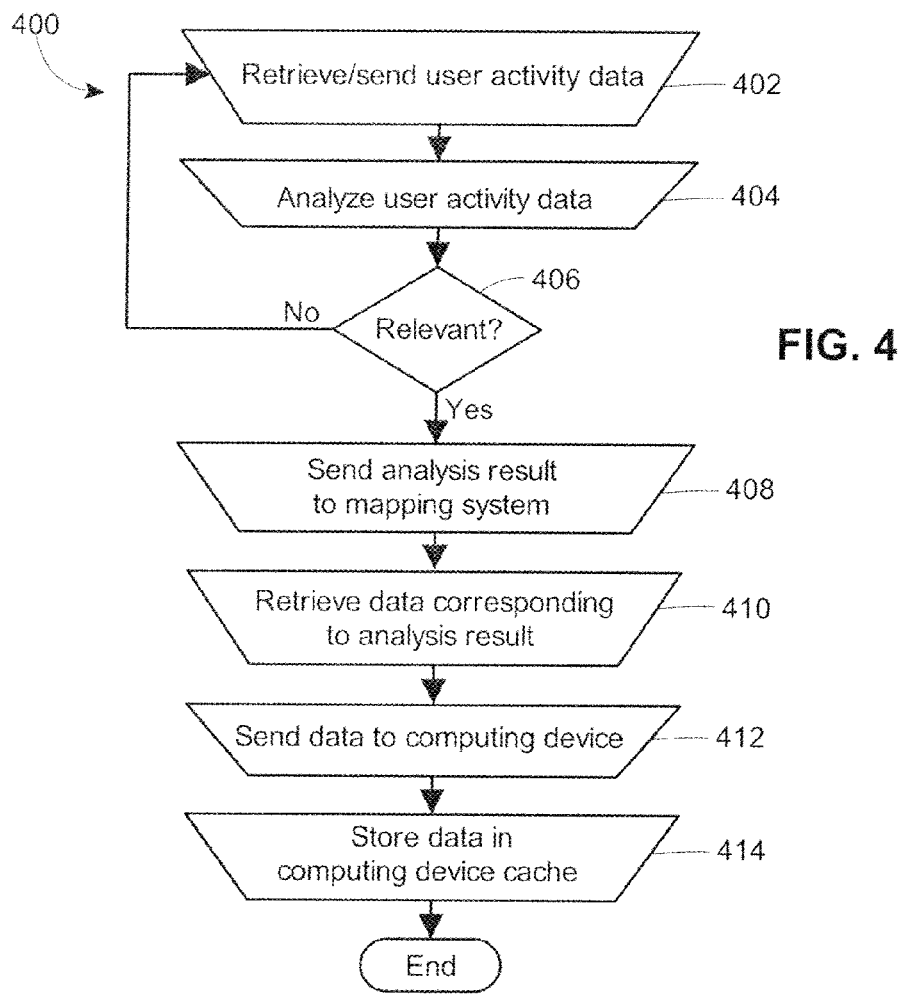
FIG. 4 is an exemplary flow chart of one method for pre-fetching label and place page data for a web-based mapping system as described herein.

FIG. 4 is a flow diagram of an example method 400 for pre-fetching label and place page data 119 for storage within a cache memory 124 and subsequent display on a client device 102. The method 400 may include one or more blocks, modules, functions or routines in the form of computer-executable instructions that are stored in a tangible computer-readable medium and executed using a processor 108 of the client device 102 (e.g., a smart phone, tablet computer, or a mobile computing device, or other personal computing device, as described herein). The method 400 may be included as part of any modules of a computing environment for a system 100 for pre-fetching label place page data 119, for example, or as part of a module that is external to such a system. For example, the method 400 may be part of a backend user activity system module 129, a frontend user activity data module 140, or a mapping module 106. The method 400 may execute at either the frontend 102 or backend 110. Further, a user may activate or disable one or more options to allow or prohibit the system 100 to collect or send user activity data 119 from any applications 302 executing at the client device 102. For example, a user interface of the mapping module 106A at may allow a user to opt-in or opt-out of any user activity data 119 data collection as described herein. FIG. 4 will be described with reference to FIGS. 1A, 1B, 2, and 3 for ease of explanation, but the method 400 may of course be utilized with other objects and user interfaces.

At block 402, the method 400 may retrieve or receive user activity data 300 from one or more applications 302 executing on a client computing device 102. The activity data 300 retrieved from the applications 302 may include a history file corresponding to a log of web page requests, locations, flight information, e-mail discussions, social networking profile information, etc. E-mail, instant messaging, or social networking conversations may be logged along with electronic purchase receipts and other data related to mapping and web-based activities the user completes using the client device 102. In some embodiments, the user activity data 300 may be retrieved from the client device 102 in response to a request from the user activity system 114. In further embodiments, the client device 102 may periodically send the user activity data 300 to backend components 110. Furthermore, the user activity system 114 may retrieve/receive the user activity data 300 from other sources such as another computing device linked to the mapping system 100 via a web services account that is common to a user of both the client computing device 102 and the other device.

At block 404, the method 400 may analyze the user activity data 300 sent or retrieved from the client computing device 102 at block 402. In some embodiments, the method 400 may send the user activity data 300 to a local module (e.g., the user activity module 140) or a remote user activity system 114 via a network connection. For example, a user activity server 128 may receive or retrieve the data 300 and the module 129 may parse the data 300 to discover user activity location data 314. The module 129 may include one or more computer-executable instructions to parse the data 300 to identify or determine user activity location data 314 from the user activity data 300. The user activity location data 314 determined from the user activity data 300 may include a city name, an address, an airport code, GPS coordinates or any other information indicating a geographic location.

If, at block 406, the user activity location data 314 is relevant enough to warrant pre-fetching label and place page data, then the module 129 or module 140 may send the location data 314 to a mapping system 112 at block 408. In some embodiments, location data 314 determined from the data 300 may be sent to the mapping system 112 as a request for label and place page data 119 corresponding to the location data 314. Block 408 may include one or more computer-executable instructions to analyze the user activity data 300 to determine if any discovered user activity location data 314 is relevant enough to continue pre-fetching label and place page data for storage in a cache 124. For example, the module 129 or module 140 may only determine one instance of user activity location data 314 from the user activity data 300 that indicates "Boston" as a geographic location. Only one indication may not warrant any further action by the system 100 to cache label and place page data. However, more indications of particular user activity location data 314 from more user activity data 300 may, collectively, reach a threshold amount to warrant executing further instructions to cache the label and place page data corresponding to those geographic locations.

The module 129 or module 140 may also include computer-executable instructions to store the user activity location data 314 within one or more data repositories. For example, the module 129 or module 140 may analyze a web search history 304, determine user activity location data 314 within the history 304, and store that determined data within a repository 126. If the determined user activity location data 314 meets or exceeds a threshold amount, then the amount of user activity location data 314 may warrant executing further instructions to retrieve and cache label and place page corresponding to the location data 314.

The user activity data 300 or the determined user activity location data 314 may also include timestamp information and the module may include computer-executable instructions to determine a threshold time period for which the determination of user activity location data 314 would warrant caching the data. For example, if the module 129 or module 140 determined three user activity location data 314 indications for "Boston" within a time period of a week, the module may determine that one or more thresholds have been exceeded and execute further instructions to retrieve and cache label and place page data corresponding to Boston. In contrast, if the module 129 determined three user activity location data 314 indications for "Boston" within a time period of a year, the module 129 or module 140 may determine that one or more thresholds have not been exceeded and return to block 402. Of course, block 404 and 406 may perform statistical and other analyses of the user activity data 300 to determine whether to proceed to the next block or continue retrieving user activity data 300.

If, after the analysis of block 404 and 406, the method 400 may determine that the user activity location data 314 is relevant enough to warrant caching label and place page data at a client computing device 102 and execute block 408. At block 408, the method 400 may send location data 314 determined from the user activity data 300 at block 404 and 406 to the mapping system 112. Block 408 may send the location data 314 to the mapping system 112 as a request for label and place page data 119 corresponding to the data 314. In some embodiments, the user activity system 114 may send the location data 314 to the mapping system server 116 for processing by the module 116a.

At block 410, the module 117 may execute instructions to match the received location data 314 to label and place page data 119. In some embodiments, block 410 includes instructions to match the received user activity location data 314 to label and place page data 119 that corresponds to an analysis result 140 sent to the mapping system 112 by the user activity module 140 executing on the client device 102. In further embodiments, block 410 includes instructions to match the received user activity location data 314 to label and place page data 119 that corresponds to an analysis result 140 sent to the mapping system 112 by the user activity system 114 executing as a backend component 110.

At block 412, the module 117 may execute instructions to send the label and place page data retrieved at block 410 to a client computing device 102. In some embodiments, block 412 includes instructions to cause the mapping system 112 to send label and place page data 119 to the client device 102. As discussed above, because the map tile data is relatively data intensive compared to the label and place page data 119, block 412 might initially send label and place page data 119 to the computing device 106. Later, map tile data 117 may be retrieved and the label and place page data may be layered onto the map tile data 117 and graphically displayed together. The method 400 may also send the retrieved label and place page data 119 to a mapping module 106 executing on the client computing device 102.

At block 414, the client computing device 102, mapping module 106, or user activity module 140 that received the label and place page data 119, may execute instructions to store the received data within a cache memory 124. The mapping module 106 may then use the cached label and place page data 125 for display on the client computing device 102 from the cache 110 during periods of low or no connectivity between the client computing device 102 and the backend components 110.

Figure 5:
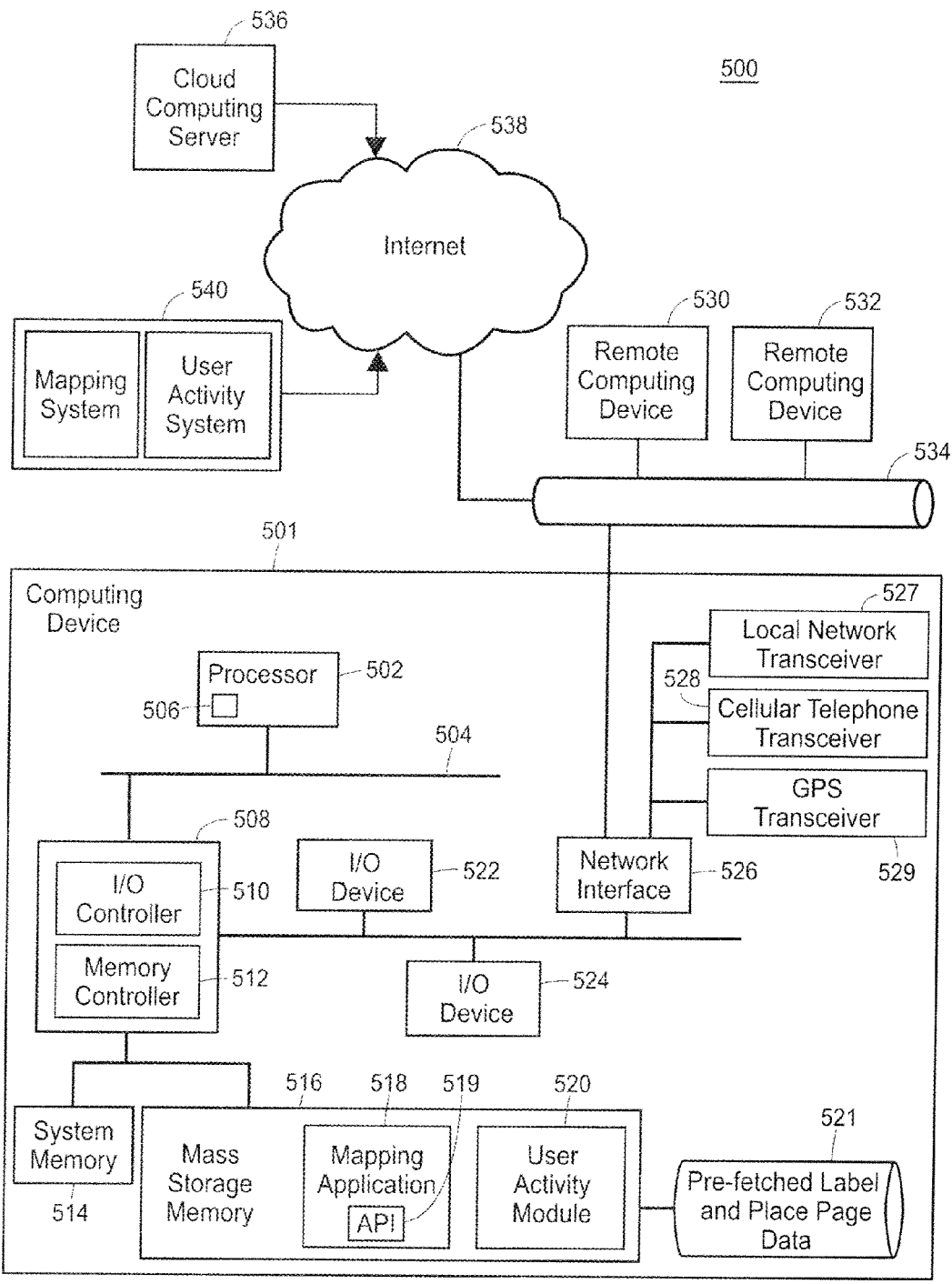
FIG. 5 is high-level block diagram of a computing environment that implements a system and method for pre-fetching label and place page data for cache storage and display on a computing device executing a mapping application.

FIG. 5 is a high-level block diagram of an example computing environment for a mobile mapping system 500 having a computing device 501 that may be used to implement the systems and methods described herein. The computing device 501 may include a mobile computing device 102 (e.g., a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example mobile mapping system 500 may be used to implement and execute the example system of FIG. 1A, the modules of FIG. 1B, the data structures of FIGS. 2 and 3, the method of FIG. 4, and the like. Although the example mobile mapping system 500 is described below as including a plurality of peripherals, interfaces, chips, memories, etc., one or more of those elements may be omitted from other example processor systems used to implement and execute the example system 100 to pre-fetch label and place page data. Also, other components may be added.

As shown in FIG. 5, the computing device 501 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which includes a memory controller 510 and a peripheral input/output (I/O) controller 512. As is well known, a chipset typically provides I/O and memory management functions as well as a plurality of general purpose and/or special purpose registers, timers, etc. that are accessible or used by one or more processors coupled to the chipset 508. The memory controller 510 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement a mapping application 518 having an API 519 and a user activity module 520 (including instructions as described by the method 400 of FIG. 4), the mass storage memory 516 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 501 and the mobile mapping system 500. Thus, a module, block, function, operation, procedure, routine, step, and method can be implemented in hardware, firmware, and/or software. In one embodiment, program modules and routines (e.g., the mapping application 518, the API 519, the user activity module 520, etc.) are stored in mass storage memory 516, loaded into system memory 514, and executed by a processor 502 or can be provided from computer program products that are stored in tangible computer-readable storage mediums (e.g. RAM, hard disk, optical/magnetic media, etc.). Mass storage 516 may also include cache memory 521 storing pre-fetched label and place page data and other data for use by the mapping application 518 and user activity module 520.

The peripheral I/O controller 510 performs functions that enable the processor 502 to communicate with peripheral input/output (I/O) devices 522 and 524, a network interface 526, a cellular network transceiver 527, a local network transceiver 528, and a GPS transceiver 529 (via the network interface 526) via a peripheral I/O bus 528. The I/O devices 522 and 524 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 522 and 524 may be used with the mapping application 518 and user activity module 520 to receive GPS data from the GPS transceiver 529, send the GPS data to the backend components of the system 100, render (e.g., create a raster image from map tile data received in a vector format), and display maps and user interfaces as described in relation to the figures. A cellular telephone transceiver 527 may be resident with the local network transceiver 528. The local network transceiver 528 may include support for a Wi-Fi network, Bluetooth, Infrared, or other wireless data transmission protocols. In other embodiments, one element may simultaneously support each of the various wireless protocols employed by the computing device 501. For example, a software-defined radio may be able to support multiple protocols via downloadable instructions. In operation, the computing device 501 may be able to periodically poll for visible wireless network transmitters (both cellular and local network) on a periodic basis. Such polling may be possible even while normal wireless traffic is being supported on the computing device 501. The network interface 528 may be, for example, an Ethernet device, an asynchronous transfer mode (ATM) device, an 802.11 wireless interface device, a DSL modem, a cable modem, a cellular modem, etc., that enables the system 100 for pre-fetching label and page data to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits. The mobile mapping system 500 may also implement the mapping application 518 and user activity module 520 on remote computing devices 530 and 532. The remote computing devices 530 and 532 may communicate with the computing device 501 over an Ethernet or other type of link 534. For example, the computing device 501 may receive label and place page data created by an application executing on a remote computing device 530, 532. In some embodiments, the mapping application 518 and/or the user activity module 520 may be retrieved by the computing device 501 from a cloud computing server 536 via the Internet 538. When using the cloud computing server 536, the retrieved mapping application 518 and/or the user activity module 520 may be programmatically linked with the computing device 501. The mapping application 518 and/or the user activity module 520 may be a Java® applet executing within a Java® Virtual Machine (JVM) environment resident in the computing device 501 or the remote computing devices 530, 532. The mapping application 518 and/or the user activity module 520 may also be "plug-ins" adapted to execute in a web-browser located on the computing devices 501, 530, and 532. In some embodiments, the mapping application 518 and/or the user activity module 520 may communicate with back end components 540 such as the mapping system 112 and user activity system 114 via the Internet 538.

Using the systems and procedures described above, the system for pre-fetching label and place page data 500 may retrieve and analyze data generated by an application executing on a client computing device that indicates a geographic location. For web-based user activity, a browser history or other data may be parsed to determine likely locations for pre-fetching label and place page data. Similarly, local application data indicating trip planning or other location-based activities may be stored at the mobile device, forwarded to a remote user activity system or a local user activity module, and used by a mapping system to provide locations to pre-fetch label and place page data. Of course, the systems described herein may present a user with a user interface from which the user is able to opt-out of any of the user activity data gathering and pre-fetching methods described herein.

The system 500 may include but is not limited to any combination of a LAN, a MAN, a WAN, a mobile, a wired or wireless network, a private network, or a virtual private network. Moreover, while only three remote computing devices 530 and 532 are illustrated in FIG. 5 to simplify and clarify the description, it is understood that any number of client computers are supported and can be in communication within the system 500.

Additionally, certain embodiments are described herein as including logic or a number of components, modules, or mechanisms. Modules may constitute either software modules (e.g., code embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for pre-fetching label and place page data for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for pre-fetching place page data based upon analysis of data generated by applications executing on a client computing device that indicate future user activities through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for pre-fetching label and place page data from a remote mapping system for subsequent display on a client computing device, the method comprising:
    analyzing user activity data indicative of multiple past activities of a user to determine geographic location data, wherein the user activity data includes data generated by execution of an application at the client computing device and the user activity data indicates a geographic location;
    receiving the geographic location data at the remote mapping system, wherein the remote mapping system includes (i) vector data specifying geometric shapes for map features to be rendered on the client computing device and (ii) label and place page data describing each map feature, the label and place page data including one or more of plain text, a data feed, and a URL, and both the vector data and the label and place page data correspond to the geographic location data;
    matching the geographic location data to label and place page data;
    sending the matched label and place page data to the client computing device, including not sending the vector data to the client computing device at the same time as sending the label and place page data;
    storing the matched label and place page data in a cache memory of the client computing device; and
    subsequently retrieving the matched label and place page data from the cache memory of the client computing device without further communication between the remote mapping system and the client computing device.

2. The computer-implemented method of claim 1, wherein the application includes one or more of a mapping application, a web browser, a trip planning application, an e-mail application, and a social networking application.

3. The computer-implemented method of claim 2, wherein the user activity data includes one or more of a history file corresponding to a log of mapping application searches, web page requests, locations, flight information, e-mail discussions, and social networking profile information.

4. The computer-implemented method of claim 3, wherein the geographic location data includes one or more of a city name, an address, an airport code, or global positioning system coordinates.

5. The computer-implemented method of claim 1, further comprising determining if the matched geographic location data is relevant, wherein relevant geographic location data includes a number of geographic location indications above a threshold.

6. The computer-implemented method of claim 5, wherein receiving the geographic location data includes receiving relevant geographic location data at the remote mapping system and matching the geographic location data to the label and place page data includes matching the relevant geographic location data to the label and place page data.

7. A computer-implemented method for pre-fetching label and place page data from a remote mapping system for subsequent display on a client computing device during conditions of no connectivity between the remote mapping system and the client computing device, the method comprising:
    periodically analyzing user activity data, indicative of multiple past activities of a user, at the client computing device to determine geographic location data corresponding to the user activity data, wherein the user activity data includes data generated by execution of an application at the client computing device, the user activity data indicates a geographic location, the application includes one or more of a mapping application, a web browser, a trip planning application, an e-mail application, and a social networking application, the user activity data includes one or more of a history file corresponding to a log of mapping application searches, web page requests, locations, flight information, e-mail discussions, and social networking profile information, and the determined geographic location data includes one or more of a city name, an address, an airport code, or global positioning system coordinates;
    sending the determined geographic location data to the remote mapping system;
    receiving label and place page data corresponding to the determined geographic location data at the client computing device, the label and place page data describing graphic map features and including one or more of plain text, a data feed, and a URL, including not receiving vector data specifying geometric shapes for rendering the graphic map features from the remote mapping system at the same time as receiving the label and place page data;
    storing the corresponding label and place page data in a cache memory of the client computing device; and
    subsequently retrieving the corresponding label and place page data from the cache memory of the client computing device without further communication between the remote mapping system and the client computing device.

8. The computer-implemented method of claim 7, wherein the remote mapping system matches the determined geographic location data to the corresponding label and place page data stored within a data repository of the remote mapping system.

9. The computer-implemented method of claim 7, further comprising determining if the corresponding geographic location data is relevant, wherein relevant geographic location data includes a number of geographic location indications above a threshold and sending the determined geographic location data includes sending relevant geographic location data from the client computing device to the remote mapping system and the remote mapping system matches the relevant geographic location data to the corresponding label and place page data.

10. A client computing device comprising:
    a processor;
    a memory storing an application and instructions for execution by the processor, the instructions for using the processor to periodically cause user activity data, indicative of multiple past activities of a user, to be sent to a remote mapping system via a network connection, wherein the user activity data indicates a geographic location and includes data generated by execution of the application using the processor, the remote mapping system includes (i) vector data specifying geometric shapes for map features to be rendered on the client computing device, and (ii) label and place page data describing each map feature, the label and place page data including one or more of plain text, a data feed, and a URL, and both the vector data and the label and place page data correspond to the geographic location data;

a transceiver for receiving label and place page data from the remote mapping system via the network connection, including not receiving the vector data from the remote mapping system at the same time as receiving the label and place page data;

a cache memory to store the label and place page data received by the transceiver; and a mapping module including instructions to cause the processor to display the received label and place page data from the cache memory without further communication between the remote mapping system and the client computing device.

11. The client computing device of claim 10, wherein the user activity data includes one or more of a history file corresponding to a log of mapping application searches, web page requests, locations, flight information, e-mail discussions, and social networking profile information.

12. The client computing device of claim 10, wherein the geographic location data includes one or more of a city name, an address, an airport code, or global positioning system coordinates, and wherein the backend mapping system includes instructions for execution by a processor for determining if the geographic location data is relevant, wherein relevant geographic location data includes a number of geographic location indications above a threshold.

13. A client computing device comprising:

a processor;

a memory storing an application and instructions for execution by the processor, the instructions for using the processor to analyze user activity data, indicative of multiple past activities of a user, to determine geographic location data, wherein the user activity data includes data generated by execution of an application at the client computing device and the user activity data indicates a geographic location;

a transceiver for sending a request for label and place page data to a remote mapping system and to receive label and place page data in response to the request, wherein the request includes the determined geographic location data, the remote mapping system includes (i) vector data specifying geometric shapes for map features to be rendered on the client computing device and (ii) label and place page data describing each map feature, the label and place page data including one or more of plain text, a data feed, and a URL, and both the vector data and the label and place page data correspond to the geographic location data;

a cache memory to store the requested label and place page data received by the transceiver, wherein the transceiver does not receive the vector data from the remote mapping system at the same time as receiving the label and place page data; and a mapping module including instructions to cause the processor to display the received label and place page data from the cache memory without further communication between the remote mapping system and the client computing device.

14. The client computing device of claim 13, wherein the user activity data includes one or more of a history file corresponding to a log of mapping application searches, web page requests, locations, flight information, e-mail discussions, and social networking profile information, and the geographic location data includes one or more of a city name, an address, an airport code, or global positioning system coordinates.

15. The client computing device of claim 13, wherein the memory includes further instructions for determining if the geographic location data is relevant, wherein relevant geographic location data includes a number of geographic location indications above a threshold.

16. A non-transitory tangible computer readable medium storing instructions adapted for execution on a processor of a mobile computing device, the instructions, when executed, cause the processor to:

analyze user activity data to determine geographic location data, wherein the user activity data includes data generated by execution of an application at the mobile computing device and the user activity data indicates a geographic location;

receive the geographic location data at the remote mapping system, wherein the remote mapping system includes (i) vector data specifying geometric shapes for map features to be rendered on the mobile computing device and (ii) label and place page data describing each map feature, the label and place page data including one or more of plain text, a data feed, and a URL, and both the vector data and the label and place page data correspond to the geographic location data;

match the geographic location data to label and place page data;

send the matched label and place page data to the mobile computing device, including not send the vector data to the client computing device at the same time as sending the label and place page data;

store the matched label and place page data in a cache memory of the mobile computing device; and subsequently retrieve the matched label and place page data from the cache memory of the mobile computing device without further communication between the remote mapping system and the mobile computing device.

17. The non-transitory tangible computer readable medium of claim 16, wherein the application includes one or more of a mapping application, a web browser, a trip planning application, an e-mail application, and a social networking application, the user activity data includes one or more of a history file corresponding to a log of mapping application searches, web page requests, locations, flight information, e-mail discussions, and social networking profile information, and the geographic location data includes one or more of a city name, an address, an airport code, or global positioning system coordinates.

18. The non-transitory tangible computer readable medium of claim 16, further comprising instructions that, when executed, cause the processor to determine if the matched geographic location data is relevant, wherein relevant geographic location data includes a number of geographic location indications above a threshold.

19. The non-transitory tangible computer readable medium of claim 18, wherein the instructions that, when executed, cause the processor to send the matched label and place page data to the mobile computing device, further cause the processor to send relevant geographic location data to the mobile computing device.

20. A non-transitory tangible computer readable medium storing instructions adapted for execution on a processor of a mobile computing device, the instructions, when executed, cause the processor to:

periodically analyze user activity data, indicative of multiple past activities of a user, at the mobile computing device to determine geographic location data corresponding to the user activity data, wherein the user activity data includes data generated by execution of an application at the mobile computing device, the user activity data indicates a geographic location, the application includes one or more of a mapping application, a web browser, a trip planning application, an e-mail application, and a social networking application, the user activity data includes one or more of a history file corresponding to a log of mapping application searches, web page requests, locations, flight information, e-mail discussions, and social networking profile information, and the determined geographic location data includes one or more of a city name, an address, an airport code, or global positioning system coordinates;

send the determined geographic location data to the remote mapping system;

receive label and place page data corresponding to the determined geographic location data at the mobile computing device, the label and place page data describing graphic map features and including one or more of plain text, a data feed, and a URL, including not receive vector data specifying geometric shapes for rendering the graphic map features from the remote mapping system at the same time as receiving the label and place page data;

store the corresponding label and place page data in a cache memory of the mobile computing device; and subsequently retrieve the corresponding label and place page data from the cache memory of the mobile computing device without further communication between the remote mapping system and the client computing device.

21. The tangible computer readable medium of claim 20, wherein the remote mapping system matches the determined geographic location data to the corresponding label and place page data stored within a data repository of the remote mapping system.

22. The tangible computer readable medium of claim 20, further comprising instructions that, when executed, cause the processor to determine if the corresponding geographic location data is relevant, wherein relevant geographic location data includes a number of geographic location indications above a threshold and the instructions to send the determined geographic location data include instructions to send relevant geographic location data from the client computing device to the remote mapping system and the instructions further cause the remote mapping system to match the relevant geographic location data to the corresponding label and place page data.

23. The computer-implemented method of claim 1, wherein the user activity data includes data generated by execution of a plurality of different applications at the client computing device.

* * * * *